April 18, 1967 D. D. APPLEGATH ETAL 3,315,035
TRANSPARENT MIXED EPOXY RESIN COMPOSITION AND SAFETY
LAMINATED ARTICLES MADE THEREFROM
Filed March 29, 1961 2 Sheets-Sheet 1

INVENTORS.
Douglas D. Applegath
Walter A. Henson
BY C. W. Carlin
ATTORNEY

United States Patent Office 3,315,035
Patented Apr. 18, 1967

3,315,035
TRANSPARENT MIXED EPOXY RESIN COMPOSITION AND SAFETY LAMINATED ARTICLES MADE THEREFROM
Douglas D. Applegath and Walter A. Henson, Midland, Mich., assignors to The Dow Chemical Company, Midland, Mich., a corporation of Delaware
Filed Mar. 29, 1961, Ser. No. 99,306
26 Claims. (Cl. 178—7.82)

The invention relates to an improved epoxy resin composition and to laminar structures employing the composition as the luminant, as well as to the method of making the laminar structure.

This application is a continuation-in-part of co-pending application for U.S. Letters Patent having Ser. No. 783,189, filed Dec. 29, 1958, now abandoned.

The term "epoxy resin," as used herein, refers to a resinous composition employing an epoxylated or epoxidized polyhydric organic compound in the preparation thereof. An epoxylated or epoxidized compound contains at least one oxirane group per molecule. Epoxy resins include liquid or relatively low-melting thermoplastic resins composed of such compounds having an average of more than 1 oxirane group and usually at least an average of 1.5 oxirane groups per molecule and which may be (and are) admixed with a hardening agent while remaining in an uncured state, as well as the solid, thermosetting product obtained by curing the resin/hardening agent admixture. The term "laminar structure," as used herein, refers to at least two flat or contoured sheets or plates integrally bonded in relatively closely spaced, substantially (but not necessarily) parallel, opposing relationship using a solid adhesive composition for the lamination between the sheets or plates. The adhesive composition generally is fluid when applied or injected and is subsequently cured, hardened, or set in situ to a non-fluid state. The term "laminant," as used herein, refers both to the fluid adhesive compositions employed in making laminar structures, and to the solid adhesive composition in the cured state.

A large number of types of laminar articles and structures are widely used. They usually consist essentially of tiers or plies of sheets, panels, plates, and the like of solid wood, glass, plastic, metal, or of pressed, bonded, or matted cellulosic, fibrous, granular, or fragmented material of various types laminated by means of various glues, cements, and the like.

It would be advantageous to provide improved and even more suitable laminants for use in making various types of laminar articles and structures adapted to give satisfactory service for prolonged periods of use under widely differing conditions.

There is a continuous and growing need for improved laminants for specific uses. A particular need exists for a laminant which, in the uncured state, is fluid and flows readily at moderate heat conditions and which cures rapidly and firmly to a thermoset solid. Another particular need exists for a laminant which, when cured, is sufficiently flexible and elastomeric, yet sufficiently strong and tough, to withstand shock and strains induced by impact and abrupt pressure changes, and which possesses stability against deleterious effects of high frequency radiations. A more particular need exists for a laminant, which, when cured, is also of such adhesive nature that it adheres to solid surfaces of materials of the types employed as lamina that the bonds formed between the laminant and the solid surface will not rupture when subjected to strain or shock but will tenaciously adhere even though the lamina itself be broken, thereby rendering the laminar structure shatterproof. A still more particular need exists for such laminant which, when cured, is also stable under wide temperature conditions so that it can be subjected both to frigid and tropical temperatures without any detectable lessening of adhesion or cohesion and without any permanent deterioration of desirable properties. A further need exists for a laminant which is also transparent and non-distorting of images and is acceptable for use in laminating transparent articles intended for use in transparent panels and viewing screens.

The present invention meets these needs by providing a resin composition which has low viscosity and which, prior to admixture therewith of a hardening agent, is stable under normal handling conditions including storage, shipping, and the like without detrimental effect. When the resin of the invention is admixed with a curing agent and allowed to stand, it cures readily. This is generally accompanied by substantially no shrinkage nor creation of voids, haze, or objectionable color. It forms an elastomeric, flexible, strong and tough product that is capable of withstanding shock, ray emanations, e.g., those produced by a Crooke's or cathode ray tube, sudden and pronounced pressure changes, physical impact, and extremes of heat and cold. It is transparent and non-distorting. When it is laminated to surfaces of glass, plastic, and the like, it adheres thereto with such tenactiy that the bond is retained and unbroken even when the laminar structure is subjected to impact, shock, or sudden pressure change (e.g., an implosion) such as to cause breakage of laminae into innumerable small pieces. Thus, the resin imparts shatterproof properties to the laminar structure.

After the resin/hardening agent admixture has been fully cured, its physical properties remain substantially unchanged for very long periods of time that, often times, extend far beyond the practical need therefor.

The resin is well suited for casting, plying, and layering, particularly where an adhesive of superior properties is desired. It is also useful for coating, impregnating, and the like. It is, as stated, especially suitable for laminating transparent sheets, e.g., glass or plastic.

Glass laminar structures employing layers (up to 0.1 inch or so thick) of the resin of the invention as the laminant exhibit all the above mentioned desirable properties. For example, typical laminar structures employing the resin of the invention in a thickness of about 0.06 inch, a thickness especially suitable for laminating, show a bond strength to the glass of over 135 pounds per square inch (p.s.i.). Such typical specimens of the glass laminar structure of the invention can be repeatedly and alternately subjected to temperatures of −50° F. and 180° F. and a relative humidity of 95 percent at 100° F. for many months with no accompanying or resulting noticeable deteriorating effects. Thus, such exposure occasions no "pock" marks, "worm" tracks, or other indications of weakening of adhesive or cohesive bonds (or in some instances, breaking of the lamina itself). Such defects are common for most resins when employed as a laminant due, among other things, to lack of adequate cohesive or adhesive strength and of satisfactory flexibility. The strain inducing the above undesirable effects is understandable when it is borne in mind that the coefficient of thermal expansion of glass is about $0.9 \times 10^{-4}$ whereas, that of plastics, although varying, is substantially greater, 0.5 to $7 \times 10^{-3}$ being illustrative thereof.

Standard A.S.T.M. tests designed to ascertain the percent elastic recovery and percent elongation at break are indicative of flexibility. Typical specimens of the invention, when so tested, have elastic recoveries as high as 95 percent and elongations at break, at 77° F., of over 200 percent. It is understood that the resin of the invention may have lower values than those above, e.g., of elastic recovery and of elongation at break, dependent upon the intended end use of the resin.

Transparency and clarity of the resin are superior and the long retention of these properties is outstanding. Its refractive index is substantially that of glass, i.e., about 1.5 to 1.6 at 77° F. This, together with its transparency and flexibility, opens a wide vista of potential uses therefor along the above indicated lines including employment thereof as a laminant for making shields or panels for transparent closures generally (among which are observation ports and peep holes for reaction chambers), transparent containers (e.g., those housing electric devices) and for use in windowed compartments in a broad sense where danger from shattered glass is possible. Illustrative of the last named application is the face of cathode ray tubes (of which the television picture tube is representative), wherein the laminant employed is subjected to sudden strain, as for example, that due to sudden collapse of the evacuated tube, referred to as an implosion.

The term "tube" is used herein, when referring to electronic devices, in the usual sense of an hermetically sealed envelope or bulb, e.g., of the nature of a Crooke's or cathode ray tube.

In the annexed drawing.

Due to its transparency and resistance to crazing and to warping or swelling during or after lamination, the resin of the invention may also be used advantageously in the making of laminar protective coverings for designs, murals, and other decorative works of art.

Although the resin composition of the invention is particularly adapted for use in transparent laminar structures, it may additionally be employed with benefit where transparency is not required. For example, it may be a preferred resin to employ for laminating inner linings to metal for use in lining containers, piping, casings, and the like. It may also be employed to laminate concentric tubular conduits and the like of glass, metal, or plastic whether opaque or transparent. Due to its high adhesive properties it may be employed for constructing multi-layer articles of cloth, paper, and the like, and pressure-sensitive tapes.

The suitability of a laminar glass structure of the invention for use as a protection against physical impact, thermal shock, and implosion can be conducted according to the methods employed by Underwriters Laboratories, Inc., New York, N.Y. In this procedure, the laminar structures to be tested consist of a glass panel laminated to the face of a 21-inch or 23-inch television picture tube, having the general appearance of that shown in FIGURE 2. The battery of known tests to be run consists, in brief, of: (1) low energy, (2) high energy, and (3) thermal shock tests. The low energy test comprises making a small hole through the wall of the tube being tested to ascertain the effect of slow pressure equalization. The high energy test comprises making a relatively large hole to ascertain the effect of sudden equalization of pressure. The thermal shock test comprises scratching the picture tube rim surface (the area of greatest strain); adding water to the scratched area; and then heating the glass followed by pouring chilled acetone on the scratched area of the glass.

Chromaticity is the characteristic of a light-transmitting medium which is ascertained by measuring the effect of the medium upon both the quantity and quality of light transmitted therethrough. Chromaticity values for the resin of the invention may be determined by subjecting specimens to be examined to the procedure prescribed by Internationale de L'Eclairage (i.e., the International Commission on Illumination). This procedure is adopted by the Joint Electron Device Engineering Council and the J.T.-6 Committee on Cathode Ray Tubes of the Electronics Institute of America. A description of the procedure followed in the test is set out in Report of Commission Internationale de L'Eclairage (1943), Cambridge University Press. The basic principles applied therein are set forth in Handbook of Colorimetry by H. C. Hardy (1936), Technology Press, Cambridge.

The referred-to test requires that at least 80 percent of the light incident thereto, in accordance with the procedure, be transmitted without adverse effects on image outlines or on color to be acceptable for panels for use in the protection of transparent envelopes, e.g., television picture tubes.

As a measure of color and clarity of the resin composition of the invention, the uncured resinous liquid may also be measured by a test developed by the American Public Health Association which has been adopted as the standard test of color and clarity, designated A.S.T.M. D-1209-54.

The term "transparent" (or "transparency"), as used herein, means meeting the requirements of both the chromaticity test employed by the Electronics Institute of America and the color test of the American Public Health Association.

As has been indicated, the invention contemplates and includes a new resin composition possessing a unique combination of properties which render it particularly suitable for a great number of uses. The combination or properties obtained by use of the present resin has heretofore not been found to exist in known resins. This, as has been described, possibilitates peculiar and specific uses of great advantage and far-reaching significance which have heretofore been neither feasible nor practical.

The composition of the invention, accordingly, comprises a mixture of selected polyepoxide ethers of polyhydric organic compounds in specified ranges of proportions. The term "polyepoxide," as used herein, means an epoxide containing more than an average of one terminal oxirane group per molecule. It is prepared by admixing (A) an aromatic polyepoxide ether containing up to 6 or more oxirane groups per molecule and (B) an aliphatic polyepoxide ether approaching but not exceeding an average of 2 oxirane groups per molecule, e.g., having an average of at least 1.5 but not over 2 oxirane groups per molecule. There may be present in the composition, as an optional ingredient, one or more other compounds or components designated (C), hereinafter more fully described. The (C) component is for the purpose of modifying the resin product, either to enhance desired properties thereof or as an extender of the composition to effect a saving without appreciable lessening of the utility of the composition for specific uses.

The composition of the invention lends itself to the use of known extenders and plasticizers, e.g., dibutyl phthalate, dioctyl phthalate, natural occurring oils, tricresylphosphate, and the like which are compatible and do not noticeably lessen the transparency. It is accordingly understoood that the use of such materials is within the purview of the invention.

The above-defined composition is convertible to a thermoset infusible resin composition by admixing therewith an ingredient (D) which is a hardening agent or curing agent and allowing the resulting admixture to stand for a period of between about one minute and several hours. The term "hardening agent," as used herein, defines one or several compounds added individually or as a blend to the polyepoxide mixture.

More specifically, the cured composition of the invention is an elastomeric homogeneous solid resin, which, in accordance with chromaticity requirements (as herein described) transmits at least 80 percent of light rays of the visible spectrum incident thereto and has a refractive index of between about 1.5 and about 1.6 at 77° F. The cured composition also has an elongation at break of at least about 50 percent; a tensile strength of at least about 50 p.s.i.; an elastic recovery of at least about 50 percent; a Shore A-2 hardness at 77° F. of between about 10 and about 60; is stable to thermal and light variations; and resists loss of adhesion to solid surfaces, loss of internal cohesion, or loss of transparency when subjected to extremes of heat and cold and to rays emanating from energy sources such as a Crooke's tube; and, in addition, is substantially shatterproof.

To make the resin composition of the invention, the amounts to employ of each of the (A) and (B) types of polyepoxide ethers depend upon a number of conditions. Among these are the specific compounds employed to prepare each of the types of ethers used; the selection and amount of ingredient (C), if any, admixed therewith, the selection and amount of the hardening agent (D) subsequently admixed therewith; and the desired properties and intended end use of the product so made.

Each ingredient plays an important role in contributing to the composite of desired properties existent in the end product. For example, the desired extent of rigidity and strength is largely imparted to the resin by (A), the aromatic polyepoxide ether. The desired extent of flexibility and elasticity is largely imparted to the resin by (B), the aliphatic polyepoxide ether. However, the properties of the end product are markedly affected by the nature and amount of any particular modifying ingredient (C) when it is employed, and by the nature and amount of any particular hardening agent (D) that may be selected.

Accordingly, a resin having a specific combination of properties, as set out hereinabove, can be obtained by a judicious choice of all four reactants over a rather wide range. Of course, the operable range of any one reactant is directly affected by choice and amounts of the other reactants used.

Ingredient (A), broadly speaking, is the polyepoxide ether of a polyhydric phenol compound and ingredient (B) is the polyepoxide ether of a glycol, a polyoxyalkylene glycol, or a polyepihalohydrin. The amount of each ingredient to use in the preparation of the composition of the invention is between about 20 and about 80 weight percent of (A), preferably between about 25 and about 40 percent; and between about 80 and about 20 weight percent of (B), preferably between about 60 and about 75 percent. The proportion of (C), i.e., the modifier, of which the aliphatic polyepoxide ethers of polyhydric organic compounds having an average of more than two oxirane groups per molecule and polyolefin polyepoxides are illustrative, may be employed up to about 40 percent by weight of the composition. The judicious selection and amount of the modifier ingredient to employ, as above indicated, are dependent on the selection and amount of the other ingredients including the hardening agent or combination of hardening agents to be used.

It is to be understood that any or all of ingredients (A), (B), and (C) may consist of mixtures of suitable compounds of each type of ingredient. For example, (A) may advantageously consist of either one or a plurality of epoxide ethers of a bisphenol of varying molecular weights and of an ether of a mononuclear phenolic compound of more than two hydroxyl groups, e.g., phloroglucinol, or of an epoxy novolac resin. Ingredient (B) may consist of substantially a diepoxide ether of one glycol or of a plurality of glycols and the diepoxide ether of one or a plurality of polyoxyalkylene glycols.

The hardening agent or agents which are employed in accordance with the present invention are judiciously chosen to provide both linear chain growth and crosslinking, each to the extent desired, within a reasonably short time. This imparts the composite of properties attainable by the practice of the invention.

The aromatic polyepoxide ether (A) employed in the invention may be the ether of a diphenol, bisphenol, alkyl-substituted bisphenol or diphenol, alkane bisphenol, or a polyhydric phenol or bisphenol containing more than two hydroxyl groups. The following list contains a number of such aromatic polyhydric compounds useful in preparing the aromatic polyepoxide ether employed in the practice of the invention:

catechol;
pyrocatechol;
saligenin;
dihydroxydiphenyl sulfone;
4,4'-dihydroxybiphenyl;
pyrogallol;
phloroglucinol;
novolaks;
resorcinol;
hydroquinone;
4,4'-dihydroxybenzophenone;
4,4'-isopropylidenediphenol;
4,4'-methylenediphenol;
4,4'-ethylidenediphenol;
4,4'-isobutylidenediphenol;
4,4'-sec-butylidenediphenol;
4,4'-isopropylidenebisalkylphenols, e.g.,
4,4'-isopropylidenebis(3-methylphenol) and
4,4'-isopropylidenebis(t-butylphenol);
1,1'-(1-methylbutylidene)di-2-naphthol; and
1,5-naphthalenediol.

4,4'-isopropylidenediphenol is the polyhydric aromatic compound most frequently employed in the practice of the invention. It is also known as bisphenol A.

The ether of the aromatic polyhydric compound may be prepared by reacting an epihalohydrin, usually epichlorohydrin, with such polyhydric compound in the presence of an inorganic base, usually NaOH. When a relatively low molecular weight polyepoxide ether is desired, the aromatic polyhydric compound and a molar excess of the epihalohydrin, usually from 4 to 10 moles thereof per hydroxyl provided by the polyhydric compound, are admixed and NaOH is added slowly thereto until a slight molar excess thereof is added. When a higher molecular weight polyepoxide ether is desired, either an excess of NaOH and the polyhydric compound are admixed and the epihalohydrin is slowly added thereto, maintaining a relatively low molar ratio of the epihalohydrin per hydroxyl group, or a low molecular weight polyepoxide ether, as above described, is further reacted with additional amounts of an aromatic polyhydric compound.

The following formula represents the epoxide formed when a dihydric phenol, viz., 4,4'-isopropylidenediphenol, is reacted with epichlorohydrin in the precence of NaOH:

wherein n may be from 0 to 5.

The epoxide equivalent weight and Durran's softening point are usually employed as definitive of the resin so formed. The epoxide equivalent weight is the weight, e.g., in grams, of the resin required to provide one oxirane group, i.e., one group. The epoxide equivalent weight of the polyepoxide ether of the polyhydric phenol for use in the invention should be between about 170 and about 1000. The Durran's softening point should be not over 110° C. (i.e., 230° F.).

Epoxylated novolak resins illustrate an ether useful in the practice of the invention which employs a polyhydric compound usually having more than two hydroxyls per molecule. Novolaks are prepared, broadly, by reacting an aldehyde, usually formaldehyde, with a molar excess of phenol in the presence of an acid catalyst to produce a substantially linear uncrosslinked polymer. The novolak so produced may be epoxylated, usually by reacting it with epichlorohydrin in the presence of NaOH, whereby glycidyl ether groups are formed at hydroxyl sites of the novolak. The epoxylated novolak so formed, for use in the practice of the invention, has the generic formula:

where $n$ has an average value of 0 to 4 but is usually from 0.5 to 2.5, making a usual average number of oxirane groups per molecule from 2.5 to 4.5.

The polyepoxide ether or (B) ingredient of the resin composition may be any one or mixture of the following aliphatic polyepoxide ethers in which the molecular weight of the ether does not exceed that which results in a liquid or may be rendered liquid at a temperature not greatly above room temperature, e.g., one that melts at not over about 200° F.

(1) Alpha, omega polymethylene polyepoxide ethers having the generic formula:

wherein $n$ is at least 2.

(2) Polyoxyalkylene glycol polyepoxide ethers having the generic formula:

wherein R is an alkyl group containing from 1 to 10 carbon atoms, and $n$ has a value of from zero to an integer which results in the ether having a melting point of at least not greatly above room temperature.

(3) Polyepihalohydrin polyepoxide ethers having the generic formula:

wherein X is bromine or chlorine and $n$ has a value of from zero to an integer which results in the ether having a melting point at least not greatly above room temperature.

It is understood in the above formulae that, although the number of oxirane groups per molecule approaches an average of 2 in accordance with the definition of the term polyepoxide given hereinabove, there are usually somewhat less than 2 present with from 1.5 to 2 oxirane groups per molecule being included.

The preferred aliphatic polyepoxide ethers to employ are those set out as (2) above having a molecular weight of less than about 2500 and an epoxide equivalent weight of less than about 1500. The polyoxyalkylene glycol polyepoxide ethers usually employed are the glycidyl ethers of polyoxyethylene glycol, polyoxypropylene glycol, polyoxybutylene glycol, and mixtures thereof having an average of about 2 terminal glycidyl ether groups per molecule.

The polyepoxide ether of a polyoxyalkylene glycol may be prepared by reacting a polyoxyalkylene glycol with an epihalohydrin, usually epichlorohydrin, in the presence of a Lewis acid catalyst, usually complexed with either a glycol or an ether, e.g., diethyl ether, and subsequently admixing the resulting product with a base.

Ingredient (C), which may advantageously be mixed with the polyepoxide ether mixture of (A) and (B), may be an additament which aids the curing of the composition, imparts desirable characteristics thereto, or merely serves as an extender. Among desirable characteristics provided by the modifiers are those set out below:

(1) Curing rate accelerators, among which are triphenylphosphite, phenol, alkylidene bisphenols, phloroglucinol, and resorcinol. Such accelerators may be employed up to 20 percent, but usually are not employed in excess of 5 percent, by weight of the composition.

(2) Supplemental flexibilizers, among which are the polyglycols.

(3) Curing mechanism regulators, among which are: (a) polyepoxide ethers of polyhydric compounds containing more than two hydroxyl groups per molecule, e.g., the ethers of glycerol or pentaerythritol with epihalohydrin; (b) polyepoxide ethers of alkylene oxide-glycerol adducts or of alkylene oxide-pentaerythritol; and (c) a diepoxidized diene, e.g., vinylcyclohexenedioxide or dicyclopentadiene. The curing mechanism regulators may be employed in an amount as high as 40 percent by weight of the composition but are usually not employed in excess of about 25 percent.

The selection of the proper hardening agent (which may also be one or more of any suitable ingredients) in the practice of the invention must be carefully done to obtain the properties desired. A number of conditions and circumstances serve as ready guides in the selection of the hardening agent. As hereinbefore suggested, the relative amounts of the (A), (B), and (C) ingredients employed is an important consideration to be observed in selecting the hardening agent. Of equal importance are the particular (A), (B), and (C) ingredients employed. For example, when the aliphatic (B) ingredient consists of relatively short carbon chains, and little or no (C) ingredient is employed, or the (C) ingredient consists also of short carbon chains or contains ring structures which contribute rigidity, it will easily appear to those skilled in the art, by application of the explanations, to make the choice of hardening agent from those that will provide some flexibility. On the other hand, when the (B) and/or (C) ingredient is a long carbon chain, the hardening agent selected will be one which need not add flexibility or will do so to a limited extent. Classes of hardening agents which contribute specific properties during cure are discussed more fully below.

There are four classes of hardening agents useful in the practice of the invention. Each class (with appropriate illustration) is set out as follows:

Class 1, aliphatic or aromatic primary amines (which are though to effect cure largely by reacting to couple adjacent oxirane groups) that have only two reactive amine hydrogen atoms per molecule and a molecular weight of less than 1000. The preferred amines of this class are those having a molecular weight of less than 200 selected from those which contain an hydroxyl group attached to a carbon atom which is not more than 2 carbon atoms removed from the carbon to which the amino group is attached.

Specific examples of hardening agents of Class 1 are:

(a) Alkylmonoamines having the generic formula wherein R may be H or a lower alkyl group and $x$ has a value of 0 to about 24.

(b) Aniline and lower alkyl ring substituted aniline.
(c) Piperazine, lower alkyl ring substituted piperazine.
(d) Oxyalkylenehydroxyamines, e.g., $$HO-(R-O)_xR-NH_2$$

wherein R is an alkylene group containing between 2 and 5 carbon atoms and $x$ has a value of 1 to 18. A molecular weight in excess of 2000 is seldom used.

(e) Alkanolamines and those having lower alkyl substituents on the alkane chain, which have but 2 amine hydrogen atoms, of the generic formula wherein R and R′ are independently selected from the lower alkyl group.

(f) The reaction product of styrene oxide and ammonia having the formula:

(g) Adducts of 2 moles of an alkylmonoamine and 1 mole of polyepoxide ether of a bisphenol, the adduct having the formula:

wherein R is a lower alkyl group and $x$ may be zero or from 1 to 5.

(h) Adducts of 2 moles of an alkylmonoamine and 1 mole of diglycidyl ether having the formula:

wherein R is a lower alkyl group.

(i) Adducts of 1 mole of an alkylene diamine and 2 moles of an alkylene oxide having the formula:

wherein R is ethylene, propylene, butylene, or amylene and $R^1$, $R^2$, $R^3$ and $R^4$ are independently selected from H and lower alkyl groups.

(j) Adducts of 2 moles of acrylonitrile and 1 mole of an alkylene diamine having the formula:

wherein R is ethylene, propylene, butylene, or amylene.

Class 2, aliphatic and aromatic amines (which are also thought to effect cure largely by creating cross links between oxirane groups) but which have more than two reactive amine hydrogen atoms per molecule and have a molecular weight of less than about 5000. Among such amines are alkylene polyamines, alkane diamines, and products resulting from reacting amine groups with other compounds such as those set out below.

Illustrative of hardening agents falling under Class 2 above are the following:

(a) Alkylene or polymethylene diamines having the formula:

$$H_2N-R-NH_2$$

wherein R is an alkylene group which contains from 2 to about 24 carbon atoms, of which propylene diamine is illustrative.

(b) Polyalkylenepolyamines having the formula:

$$H_2N-(R-NH-R)_x-NH_2$$

wherein R contains from 2 to 18 carbon atoms and $x$ has a value of from 1 to 18, of which tetraethylenepentamine is illustrative.

(c) Diaminodiphenylalkanes, e.g., (d) Xylylene diamines having the formula:

(e) Dicyandiamide.
(f) Aminoalkylenepiperazines having the formula:

wherein R is an alkylene group of from 1 to about 18 carbon atoms.

(g) Aminoalkylalkanolamines, e.g., aminoethylethanolamine.

(h) Monocyanoalkylalkylenepolyamines of which monocyanoethylethylenediamine is illustrative.

(i) Polyglycoldiamines, an example of which is that having the formula:

where $x$ has a value of 1 to about 35.

(j) Amines containing both primary and tertiary amino groups, e.g., (k) Amines containing both secondary and tertiary amino groups, e.g., (l) Amines containing primary, secondary, and tertiary amino groups.

(m) Adducts of 2 moles of an alkylenepolyamine and 1 mole of a diglycidyl ether of a bisphenol, e.g.,

H₂N—CH₂—CH₂—NH—CH₂——O—CH₂——CH₂—NH—CH₂—CH₂—NH₂

Class 3, tertiary aliphatic or aromatic amines which cure by catalyzing the coupling of oxirane groups with other epoxide groups, with hydroxyl groups, or with other activated sites present in the curable mixture.

Illustrative of Class 3 hardening agents are the following:

(a) Trialkyl-, triphenyl- or alkylphenylamines having the formula:

wherein $R^1$, $R^2$, and $R^3$ are independently selected alkyl (of from about 1 to about 18 carbon atoms) and phenyl groups.

(b) Alpha-alkylbenzyldialkylamines, e.g., wherein $R^1$ is an alkyl group of 1 to 3 carbon atoms and $R^2$ and $R^3$ are independently selected alkyl groups containing from 1 to about 18 carbon atoms.

(c) Pyridine.

(d) Hydroxyalkylpiperazine of the formula:

wherein R is an alkylene group containing from 1 to 18 carbon atoms.

(e) Trialkanolamines of the formula:

wherein $R^1$, $R^2$, and $R^3$ are independently selected alkylene groups which contain from 1 to about 4 carbon atoms.

(f) Alkylalkanolamines of the formula:

wherein $R^1$, $R^2$, and $R^3$ are alkyl or alkylene groups and contain from 1 to about 4 carbon atoms.

By the term, "lower alkyl," herein is meant an alkyl group containing up to 8 carbon atoms.

Class 4, Lewis acid or Friedel-Crafts type hardening agents.

Illustrative of Class 4 hardening agents are the following: $BF_3$, $AlCl_3$, $SnCl_4$, $ZnCl_2$, $BCl_3$, particularly such Lewis acids complexed with an ether or a polyglycol and such Lewis acids complexed with amines.

The hardening agent employed in the practice of the invention may be selected from Class 1; Classes 1 and 2; Classes 1 and 3; or from Class 4.

When a hardening agent consisting of one or more of those listed under Class 1 or under Classes 1 and 2 above is selected, it is employed in an amount which will provide between about 0.5 and about 1.5 equivalents of amine hydrogen atoms per oxirane group in the curable resin mixture. When the hardening agent consists of those selected from both Classes 1 and 3, the amount of Class 1 usually does not exceed 1 equivalent and that of Class 3, the tertiary amine employed, is determined largely by the rate of cure desired, e.g., up to about 12–15 percent by weight of the Class 1 amine being used. When the hardening agent is a Class 4 or Lewis acid type, it is employed in an amount between 0.05 and 4 percent thereof, based on the weight of the resin mixture. When the Lewis acid is complexed with an amine, glycol, or ether, the weight calculated is that of the Lewis acid content.

By judicious selection of particular polyepoxides, modifiers, and hardening agent, a resin composition in accordance with the invention is readily prepared having the desired properties of flexibility, transparency, non-distortion of transmitted images, adhesion, homogeneity, freedom from blemishes and imperfections, strength and elasticity under sudden impact and strain, and stability under repeated and extreme temperature changes.

In general, the higher the molecular weight of the alkane chain of ingredients (B) and (C), which impart flexibility, employed in the resin, the less flexibilizing properties will be desired to be imparted by the hardening agent. On the other hand, where relatively short chain length ingredients (B) and (C) are employed, the more advisable it becomes to select a hardening agent or combination thereof which imparts flexibility. Such hardening agents are exemplified by a polyoxyalkylenediamine, e.g., polyoxypropylenediamine.

The hardening agent employed in the practice of the invention, as suggested, may advantageously consist of two or more of the above compounds. A combination of compounds which is particularly effective for use as a laminant in making a laminated panel for a cathode ray tube is a mixture of a major proportion of a monoalkanolamine and a minor proportion of a polyalkylenepolyamine, especially when used to cure a mixture of polyepoxide ethers consisting of between about 25 and about 40 parts by weight of (A) the aromatic polyepoxide ethers and between about 75 and about 60 parts by weight of (B) the aliphatic polyepoxide ether. For example, a hardening agent mixture consisting of between 78 and 92 weight percent of monoethanolamine and between 22 and 8 weight percent of diethylenetriamine in an amount sufficient to provide about 1 equivalent of reactive hydrogen atoms per oxirane group in the resin is particularly highly effective in curing a resin mixture consisting of 30 to 35 parts by weight of a bisphenol A polyepoxide ether having an epoxide equivalent weight of from 475 to 575, and from 70 to 65 parts by weight of the polyepoxide ether of a polyoxypropylene glycol having an epoxide equivalent weight of about between 200 and 300.

The following examples are modes of carrying out the invention. They are not to be construed as limiting the invention. They are only a few of the reaction mixtures which are satisfactory to produce a resin composition having the properties required to be present therein, as above explained, and are set forth as illustrative only.

EXAMPLES 1–9

A series of runs was made to demonstrate that the amounts of (A), an aromatic polyepoxide ether and (B), an aliphatic polyepoxide ether, may be employed in varying proportions, and that a blend of (D) hardening agent may be employed in varying proportions, to each other, to produce a resin product having all the desired properties of the composition as set forth above. The total amount of hardening agent employed was that which provided substantially the equivalent amine hydrogen atoms per oxirane group present in the polyepoxide ether mixture.

The aromatic polyepoxide employed was that having the formula:

wherein n was of such average value as to result in a resin having an epoxide equivalent weight of from 475 to 575, and a Durran's softening point range of 165 to 176° F.

The aliphatic polyepoxide ether employed had the formula:

wherein n has a value such as to result in an average molecular weight of about 400. The epoxide equivalent weight was about 255.

The polyepoxide ethers were admixed in a suitable vessel at 200° F. until a substantially homogeneous mixture was obtained. The hardening agent, consisting of a major proportion of monoethanolamine and a minor proportion of diethylenetriamine, in the weight percent shown in Table I below, was admixed with 50-gram portions of the resulting admixture, and the gel time measured thereon. Other portions thereof were cast into suitable forms for subsequent testing and allowed to stand at a temperature of 150° F. for 12 hours.

Pertinent facts relative to the ingredients employed and the properties of the resulting admixture, both of the ungelled and cured resin, are set out in Tables I and II below.

Each laminar structure so made, was subjected to the above referred-to chromaticity test (of the International Commission on Illumination, as adopted by the Electronics Institute of America for color television). Each laminar structure so tested transmitted more than 90 percent of the light incident to the resin film without discoloration or distortion.

Each laminar structure was placed in an oven for 72 hours at 130° F. and then retained therein for an additional 4 hours at 165° F., removed therefrom, and examined. No defects such as weakening of the bonds between the laminant and either the glass shield or the television tube face or loss of transparency could be detected. Each tube was then placed in a cold box at a temperature of −30° F. for 4 hours, removed therefrom, and examined. Again no defects could be detected. Tubes so made were also tested according to the shock and implosion tests described herein and were unaffected thereby.

Reference to Table I and II shows that the resin composition of the invention can be prepared wherein the ratio of aromatic polyepoxide ether and aliphatic polyepoxide ether is varied and wherein the ratio of hardening agents selected from Classes 1 and 2 are varied and that such resins may be employed to make laminar structures which are useful for viewing purposes and stable under varying temperature conditions.

EXAMPLE 10

A second series of examples of the invention was made employing the polyepoxide ethers (A) and (B) of the examples above wherein the weight ratio of polyepoxide ether (B) was varied from 1.5 parts to 3 parts per part of (A). The resin mixture was cured in each example by admixing therewith a hardening agent consisting by weight 85 percent monoethanolamine and 15 percent diethylenetriamine in a total amount sufficient to provide equivalent amine hydrogen atoms per oxirane group. The mixing and curing procedures followed were substantially those followed in the series above.

Figure 4:
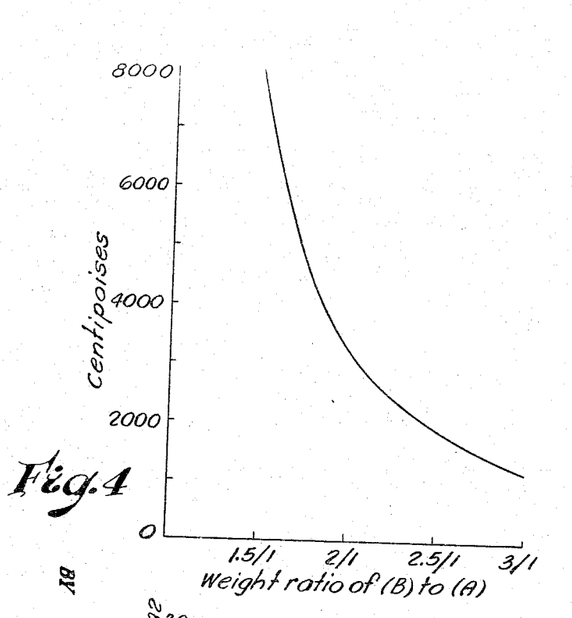
Figure 5:
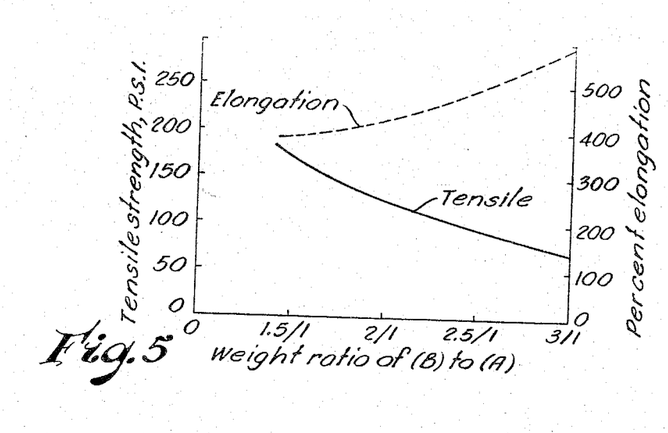
Figure 6:
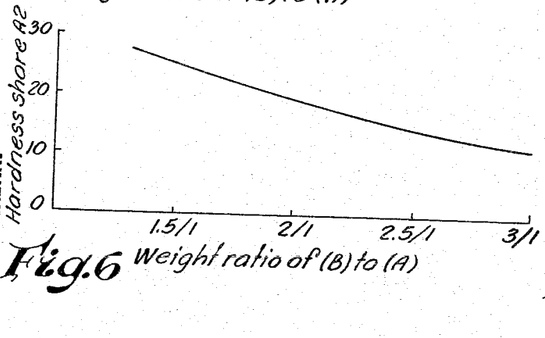

The results are shown as FIGURES 4 to 6 in the drawing, wherein the weight ratio of polyepoxide ether (B) to polyepoxide ether (A) are plotted along the horizontal

TABLE I

| Example Number | Ratio of aromatic polyepoxide to aliphatic polyepoxide ethers | Viscosity of mixture of polyepoxide at 77° F., cps. | Epoxide equivalent weight of polyepoxide mixture | Blend of hardening agents employed in weight percent [1] | Gel time in minutes |
|---|---|---|---|---|---|
| 1 | 40/60 | 7,730 | 374 | 78/22 | 4.5 |
| 2 | 40/60 | 7,730 | 374 | 85/15 | 5.5 |
| 3 | 40/60 | 7,730 | 374 | 98/2 | 10 |
| 4 | 33/67 | 3,000 | 370 | 78/22 | 4.5 |
| 5 | 33/67 | 3,000 | 370 | 85/15 | 5 |
| 6 | 33/67 | 3,000 | 370 | 92/8 | 16 |
| 7 | 25/75 | 1,080 | 347 | 78/22 | 8.5 |
| 8 | 25/75 | 1,080 | 347 | 85/15 | 9.5 |
| 9 | 25/75 | 1,080 | 347 | 92/8 | 40 |

[1] The hardening agent consisted of a major proportion of monoethanolamine and a minor proportion of diethylenetriamine. The hardening agent was employed in a total amount sufficient to provide substantially the equivalent amine hydrogen atoms for reaction with the oxirane groups present in the polyepoxide ether mixture.

TABLE II

| Example Number | Tensile Strength in p.s.i. | Elongation in percent | Transparency | Properties of laminated glass |
|---|---|---|---|---|
| 1 | 300 | 172 | 90% Light transmission | In all ways, satisfactory for "transparent" laminant structures. |
| 2 | 290 | 245 | do | Do. |
| 3 | 250 | 480 | do | Do. |
| 4 | 270 | 160 | do | Do. |
| 5 | 180–225 | 230–250 | do | Do. |
| 6 | 148 | 690 | do | Do. |
| 7 | 275 | 135 | do | Do. |
| 8 | 215 | 190 | do | Do. |
| 9 | 210 | 685 | do | Do. | axis (abscissa) and the vertical axis (ordinate) in each figure is as follows:

FIGURE 4, the viscosity in centipoises at 75° F. prior to admixture of the hardening agent;

FIGURE 5, the tensile strength in p.s.i. on the left and in accordance with the solid line curve and percent elongation on the right in accordance with the broken line curve of the cured resin; and FIGURE 6, the Shore A-2 hardness of the cured resin.

Examination of FIGURES 4 to 6 shows that satisfactory values are obtained for the properties therein plotted wherein the weight ratio of polyepoxides (B) to (A) employed are varied between 1.5 and 3. Further examination shows that the composition may be controlled to produce optimum values in accordance with the end use intended.

EXAMPLE 11

A third series of examples of the invention was made employing the aromatic polyepoxide ether (A) and the aliphatic polyepoxide ether (B), employed in the preceding examples, in a weight ratio of (B) to (A) of 2. The hardening agent consisted of a blend of monoethanolamine and diethylenetriamine, in a total amount required to provide an equivalent of amine hydrogen atoms per oxirane group in the polyepoxide mixture but wherein the weight ratio of monoethanolamine to the diethylenetriamine was varied between 92:8 and 80:20.

The mixing and curing procedures were substantially those followed in the two series of examples above.

Figures 1, 2, 3, 8:
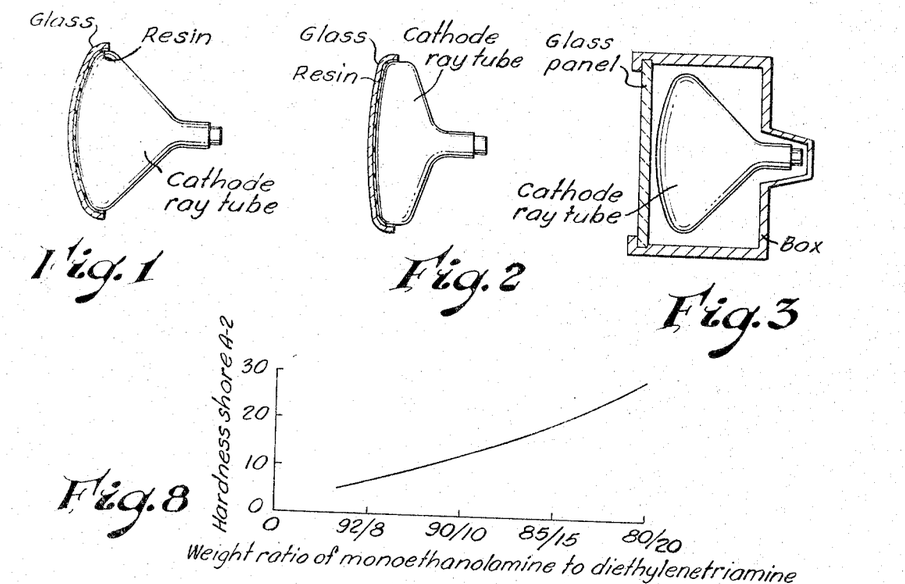
FIGURES 1 and 2 depict television picture tubes provided with sharply contoured face panels made possible by the invention.
FIGURE 3 is a conventional television tube, shown for purposes of contrast.
FIGURES 4 to 10 are graphs showing the relationship between ingredients employed and specific physical properties of the resulting resin composition.
Figure 7:
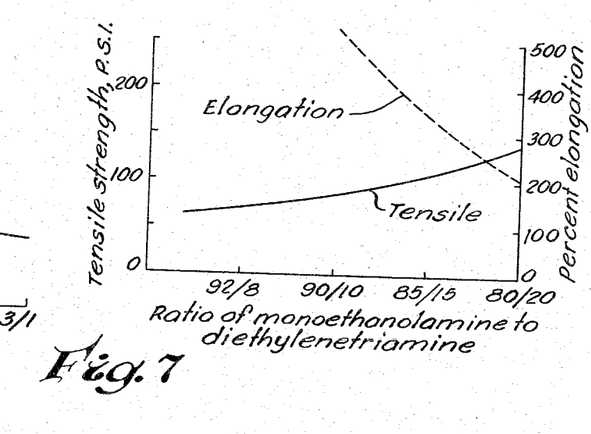

The results of this series of tests on the cured resin are shown in graphic form in FIGURES 7 and 8 of the drawing wherein the weight percent of monoethanolamine and diethylenetriamine (in a total amount of both sufficient to provide the equivalent amine hydrogen atoms per oxirane group in the thus compounded composition) is plotted along the horizontal axis, and the vertical axis in each figure is as follows:

FIGURE 7, the tensile strength in p.s.i. on the left hand side in accordance with the curve shown by solid line and percent elongation on the right hand side in accordance with the curve shown by broken line; and FIGURE 8, Shore A-2 hardness.

Examination of FIGURES 7 and 8 shows that a satisfactory resin can be obtained for the properties therein shown when a hardening agent consisting of a blend of Classes 1 and 2, as fully described hereinbefore, is employed.

EXAMPLE 12

A fourth series of examples was run employing the polyepoxide ethers (A) and (B) in the amounts employed in Example 11 and cured by admixing therewith an 85:15 weight percent blend of monoethanolamine and diethylenetriamine but wherein the total percent of the blend of hardening agent based on the polyepoxide mixture was varied from 6.5 to 9 parts by weight per 100 parts of the polyepoxide ether mixture. 85:15 is a weight ratio of about 5.5:1.

The mixing and curing procedures were substantially the same as those followed in the above series.

Figure 9:
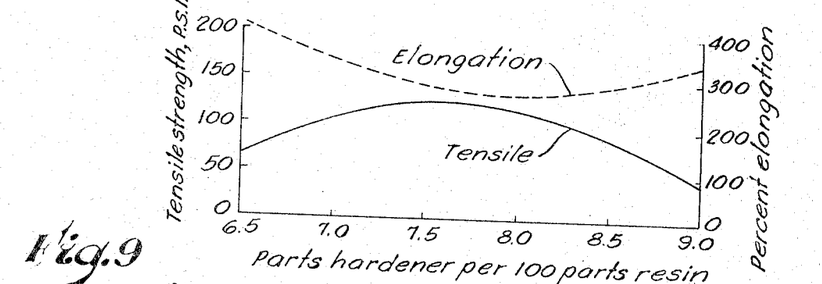
Figure 10:
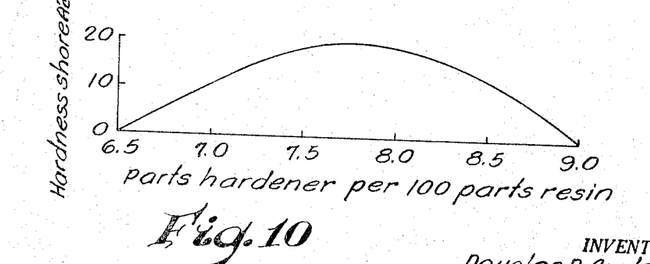

The results obtained by tests conducted on the cured resin of this series are set out graphically in FIGURES 9 and 10 wherein the horizontal axis is the parts by weight of hardening blend, based on the 100 parts by weight of resin composition, and the ordinate in each figure is:

FIGURE 9, on the left hand side, the tensile strength in p.s.i. according to the solid line curve, and, on the right hand side, the percent elongation according to the broken line curve; and FIGURE 10, Shore A-2 hardness.

Examination of FIGURES 9 and 10 shows that satisfactory results can be obtained when the hardener is employed in varying amounts based on the weight of resin.

Other portions of each of the resin mixtures prepared as above, upon admixture therewith of the hardening agent, were employed as a laminant to laminate a glass panel to the viewing face of a standard 21-inch television picture tube of the contour shown in FIGURE 2 of the drawing. The laminating procedure was carried out by maintaining the faces of the television tube and the glass sheet extension thereto in opposite relationship substantially uniformly spaced about 0.06 inch apart by means of shims, heating the bulb and sheet to about 200° F. and injecting the resin composition containing the hardening agent, preheated to about 200° F., into the 0.06 inch space thus provided and curing the assembled article so made at room temperature for 6 hours. The tubes were subjected to the Underwriters shock and implosion tests described above. No undesirable effect was produced by the various tests.

EXAMPLE 13

This example was run wherein the hardening agent employed consisted of 50 parts monoethanolamine (a Class 1 hardening agent) and 50 parts aminoethylpiperazine (a Class 2 hardening agent), in the total amount of 8 parts by weight per 100 parts of the mixture of the polyepoxide ethers (A) and (B) employed in Examples 4 to 6 above, in accordance with the practice of the invention. Films were made of the resin mixture and cured at a temperature of 200° F. for an hour. After about 24 hours at room temperature, the films were tested and showed tensile strength, elongation and elastic recovery comparable to the resin made in Examples 10–12 above. The resin was clear and transparent, stable against thermal and physical shock, suitable for television tube face plates or other laminar structures for viewing purposes.

EXAMPLE 14

This example was run to show the preparation of the resin of the invention employing as (A), the aromatic polyepoxide ether of bisphenol A and epichlorohydrin having an epoxide equivalent weight of 240, the (B) polyepoxide ether employed in Examples 10–13 and as (C), a polyepoxide ether having an epoxide equivalent weight of 144 prepared by reacting epichlorohydrin and glycerol in a molar ratio of 3 moles of epichlorohydrin to 1 of the glycerol. The mixture so made was cured by admixing therewith a Class 1 hardening agent only.

The polyepoxides, as so designated, were employed in the following amounts:

| Polyepoxide ether: | Parts by weight |
|---|---|
| (A) | 22 |
| (B) | 30 |
| (C) | 48 |

The resulting mixture was heated to 130° F. and 15 parts by weight, per 100 parts of resin, of monoethanolamine admixed therewith. One portion of the mixture thus made was cast into a film, allowed to cure for one hour and then removed from the molds for subsequent testing. Another portion of the resin-hardening agent mixture was employed as a laminant, 0.06 inch thick, to adhere a protective glass shield to the viewing face of a 23-inch television tube of the type shown in FIGURE 2. The tube and shield were also heated to about 130° F. prior to laminating.

After about 24 hours, the films were tested and the following strength and flexibility values were obtained:

| | |
|---|---|
| Tensile strength, p.s.i. | 240 |
| Elongation, percent | 241 |
| Shore A-2 hardness | 38 |

The television tube was subjected alternately to a cold temperature of −30° F. and a hot temperature of 165° F. without detrimental effects. Both before and after the tests showing the effect of temperature, the tube transmitted over 90 percent of incident light without detectable distortion or effect on color in accordance with the chromaticity test described above. The resin layer showed no undesirable performance when subjected to shock and implosion tests.

EXAMPLE 15

This example was run to show the effect of using the (A) type aromatic polyepoxide of Example 11 and a lower molecular weight (B) aliphatic polyepoxide ether mixture, cured by employing a different combination of Classes 1 and 2 hardening agents than above employed. The mixing and curing procedures were substantially those followed in the above examples. Below are the weights employed:

| Polyepoxide ether: | Parts by weight |
|---|---|
| (A) As in Example 11 | 30 |
| (B) Dipropyleneglycoldiglycidyl ether | 70 |

The resin mixture was then admixed with 15 parts by weight, per 100 parts of resin, of a hardening agent consisting of 60 weight percent of monoethanolamine (Class 1 agent) and 40 percent aminoethylethanolamine (Class 2 agent). Films were cast therefrom at about 200° F., after an hour without additional heat were removed from the molds. After about 24 hours they were tested and showed strength, flexural, and chromaticity properties comparable to the cured resin product of Example 11.

EXAMPLE 16

This example was run to show the effect of employing a glycerol-propylene oxide adduct as the (C) modifying polyepoxide ether in the practice of the invention. A resin mixture was prepared, employing the polyepoxide ethers in the amounts set out below. The mixing and curing procedures were substantially those followed in the preceding examples.

| Ingredients: | Parts by weight |
|---|---|
| (A) Aromatic polyepoxide ether employed in Examples 1 to 9 | 25 |
| (B) Aliphatic polyepoxide ether employed in Examples 1 to 9 | 40 |
| (C) Polyepoxy ether of glycerol-propylene oxide adduct, having an epoxide equivalent weight of 200 and an average of more than 2 oxirane groups per molecule | 35 |

The polyepoxide ether mixture was admixed with the hardening agent blend and in the amount employed in Examples 2, 5, and 8. A portion of the resulting mixture was cast into a film, cured for 1 hour and removed from the molds. Another portion was used to laminate a mating glass safety panel to the highly contoured viewing face of a television picture tube of the type shown in FIGURE 2. Laminating was carried out by positioning the panel 0.06 inch from the tube, heating the resin and the assembled panel and tube to 160° F., pouring the resin into the 0.06 inch space and curing the assembly at room temperature.

After about 16 hours, the following physical properties of the resin films were ascertained:

| | |
|---|---|
| Tensile strength, p.s.i. | 125 |
| Elongation, percent | 260 |
| Elastic recovery, percent | 90 |
| Shore A-2 hardness | 35-40 |

The television tube provided with the safety panel, so made, was subjected to the chromaticity test described hereinabove and found to transmit over 90 percent of the light incident to the laminant without distortion or color effects. It passed the implosion and shock tests prescribed by the Underwriters Laboratories.

EXAMPLE 17

This example shows further the effect of employing as a (C) modifier, triethyleneglycol, to prepare the resin of the invention. It also shows the effect of a cure employing a Lewis acid type hardening agent. The mixing and curing procedures were substantially those followed in the above examples. The aromatic (A) and aliphatic (B) polyepoxide ethers employed were those employed in Examples 1 to 9 above. The amounts of each type of ingredient are set out below:

| Ingredients: | Parts by weight |
|---|---|
| (A) | 54 |
| (B) | 27 |
| (C) | 19 |

With the mixture of ingredients was then admixed a hardening agent consisting of 1 percent $BF_3$ in triethylene glycol in an amount of 7.6 parts of the $BF_3$:glycol complex (i.e., 0.76 parts of $BF_3$) per 100 parts of the resin mixture. The resin and $BF_3$ complex mixture was heated to 100° F. One portion was cast into a film for testing according to standard testing procedure and found to have the following properties:

| | |
|---|---|
| Tensile strength, p.s.i. | 75 |
| Elongation, percent | 175 |
| Elastic recovery, percent | 90 |
| Shore A-2 hardness | 19-20 |

A television tube of the type shown in FIGURE 2 and a glass panel, having the pronounced contour of the face thereof, were positioned 0.06 inch apart, at room temperature, and the space so provided filled with another portion of the resin mixture. Cure appeared to be substantially complete within an hour at room conditions.

The laminated television tube so made was subjected to the chromaticity test described above. At least 90 percent of light incident to the resin laminant film was transmitted without distortion or color change. The laminated tube was then subjected alternately to −30° F. and 165° F. and re-examined. No change in the properties of the laminated face of the tube could be found.

EXAMPLE 18

To show the effect of employing an epoxy novolak resin as (A), the aromatic polyepoxide ether, in the practice of the invention, the following formulation was made up:

| Polyepoxide ethers: | Parts by weight |
|---|---|
| (A) Epoxy novolak having an average of 2.2 oxirane groups per molecule | 33 |
| (B) The aliphatic polyepoxide ether employed in Examples 1 to 9 | 67 |

To the mixture of polyepoxide ethers at 200° F. were admixed 11.9 parts by weight, per 100 parts of the resin, of an 85:15 proportion by weight of monoethanolamine and diethylenetriamine.

Film for physical testing and a laminar structure were made therefrom following the general procedure set out above and cured at room conditions. Tests of both the film and laminar structure showed the epoxy novolac resin to be substantially equivalent to the other (A) ingredients employed, i.e., polyepoxide ethers of aromatic polyhydric compounds employed in the above examples.

Comparative procedures and compositions

For purposes of comparison, known epoxy type resin compositions suggested for laminating solid surfaces were made up and attempts made to use them for laminating glass as follows:

*Comparative Run 1.*—33.3 parts by weight of an aromatic polyepoxide ether, prepared by reacting epichlorohydrin and 4,4′-isopropylidenediphenol according to known procedures, having a Durran's softening point of 43° C. and an epoxide equivalent weight of 325, were admixed with 67.7 parts by weight of a polyepoxide ether prepared by reacting epichlorohydrin and diethylene glycol according to known procedure. 10.3 parts by weight of diethylenetriamine were then admixed with the mixture so made. The resulting admixture and a television tube of the type shown in FIGURE 2 and a mating glass face panel having the same contour were heated to 110° F., positioned in mating relationship 0.06 inch apart, and the resin mixture poured into the 0.06 inch space so provided. The laminated assembly so made was cured at room temperature for 24 hours. It was thereafter subjected to the standard aging test wherein the laminated assembly was heated for 73 hours at 165° F. The assembly was removed and examined and found to have lost adhesion to the glass in several places resulting in a visibly defective area about 6 inches long at the contoured sections where the greatest thermal stresses occur. The assembly was then placed in a cold box at −30° F. for 16 hours, removed therefrom, and examined. The glass was found to be cracked along about 50 percent of the circumference of the tube face following the line of greatest curvature as a result of the thermal stresses. Several pieces of the glass fell away from the tube by the force of such stresses alone.

*Comparative Run 2.*—33.3 parts by weight of the same aromatic polyepoxide ether employed in the comparative run above were admixed with 66.7 parts by weight of a polyepoxide ether prepared by reacting epichlorohydrin and dipropylene glycol. To this admixture were added 9 parts by weight of diethylenetriamine. The resin so made was employed as a laminant according to the procedure employed in the comparative run above.

The tube so tested when examined, after the heat cycle of the test, showed loss of adhesion over about 50 percent of the circumference of the television tube face along the lines of greatest thermal stress. When examined after the cold cycle of the test, the glass had cracked around about one-third of the circumference of the tube face.

The laminar structure prepared according to the above comparative runs clearly failed. The cure provided by the hardening agents employed was unsuitable. Such results are in sharp contrast to the high degree of transparency and uneffected high adhesion shown by the resin of the invention when employed as a laminant to make laminar structures of the type employed for protection against glass shattering, as for example, the implosion of a cathode ray tube.

*Comparative Run 3.*—To 100 parts by weight of the aromatic polyepoxide ether (A) employed in Comparative Runs 1 and 2 were admixed 8.5 parts of diethylenetriamine. The resulting admixture was cast between pairs of cured glass surfaces spaced about 0.06 inch apart. The laminar structure was examined. Although the resin laminant appeared to be transparent and free of bubbles and haze, it was incapable of withstanding even slight shock and shattered badly upon impact, the resin pulling large pieces of glass out the laminae. The laminar structure of this comparative run developed marked visible defects and glass fractures upon standing six weeks at room temperature. When subjected to −30° F. and 165° F. in accordance with the tests applied to laminar structures of the invention, the glass shattered badly.

*Comparative Run 4.*—To 100 parts of the aromatic polyepoxide ether (A) employed in the run above were admixed 50 parts of polyoxypropylene glycol (molecular weight, 1200) and 8.5 parts of diethylenetriamine. The resulting admixture was cast between curved glass plates as above. Before the composition was cured, however, it acquired a milky color and by the time it was cured it was opaque.

*Comparative Run 5.*—Run No. 4 was repeated except polyoxypropylene glycol (molecular weight, 200) was substituted for the polypropylene glycol of Run 4. The product cured to a relatively transparent film. However, when the laminar structure was subjected to the alternate heat of 165° F. and cold of −30° F., loss of adhesion of resin laminant to glass occurred in a number of places and transparency was greatly impaired.

*Comparative Run 6.*—To 50 parts by weight of the aromatic polyepoxide ether employed in Run No. 1 (a bisphenol-epichlorohydrin condensate having a melting point of 43° C. and an epoxide equivalent weight of 325) were admixed 50 parts of the aliphatic polyepoxide ether prepared by reacting 3 moles of epichlorohydrin per mole of glycerol (epoxide equivalent weight of 140–160). To 100 parts by weight of the polyepoxide ether mixture were admixed, at 75° F., 6 grams of a 50 percent KOH aqueous solution, to give 3 percent by weight of the KOH based on the resin. The resin became opaque. A laminar structure was prepared as in the runs above, and the laminant thus positioned cured for 4 hours at 110° C. There resulted a hard, non-flexible white but still completely opaque resin laminant containing a large number of vapor bubbles and exhibiting poor adhesion to the glass.

The above comparative runs illustrate attempts to use known epoxy resins to laminate solid surfaces which might be thought to have application to laminating glass panels. The resin composition and the laminar structures made following such practices are clearly markedly inferior to the resin composition of the invention and the laminar structures made employing the known compositions as the laminant were unsuitable for use where transparency and stability are required.

The resin composition of the invention possesses all the following positive qualities. The presence of all of such qualities in a laminant useful for laminating transparent panels has heretofore been unknown. Salient qualities, heretofore lacking in known resins, and exhibited by the resin of the invention are:

(1) It exhibits a refractive index close enough to that of glass to become invisible when employed as a laminant in a glass laminar structure, i.e., when sandwiched between two glass pieces. Glass commonly used to enclose the viewing screen of phosphors such as is used in television picture tubes for example, has a refractive index at 77° F. of about 1.5 to 1.6.

(2) It is free from bubbles, dirt, haze, ruptures, voids, and inherent color, so that it transmits greater than 80 percent (usually greater than 90 or 95 percent) of light incident thereto including all wave lengths of the visible spectrum. Standardized tests of the Internationale de L'Eclairage show the presence of this high degree of transparency.

(3) It has sufficient adhesive and cohesive strength and impact resistance to withstand implosion or explosion of the laminated structure without allowing severe shattering of the laminae into separate pieces due either to loss of adhesion to one of the laminae or due to cohesive failure of the laminating adhesive itself. A measurement test readily carried out to demonstrate this property is ascertained by application of a tensile force in a direction which is perpendicular to the plane of the resin layer in a cured glass/resin/glass sandwich. When a specimen is so tested at a pulling rate of 0.5 inch per minute at 25° C., an adhesive laminant should not fail until at least about 100 pounds per square inch force has been applied. In all specimens of laminar structures of the invention, there was no failure of the structure until subjected to a force far above 100 p.s.i. and then failure was due to a break-down of the adhesive force holding it to the glass.

(4) The transparent adhesive resin of the invention possesses the above listed properties throughout the useful life of the laminated article. It is essentially unchanged by normal storage temperatures and by a test cycle between −30° F. and above 165° F., withstands continued vibration such as is experienced in transportation and undergoes no adverse effects by constant exposure to high humidity or other conditions normally encountered prior to and during use.

(5) The resin of the invention withstands constant exposure to high energy radiation including specific drastic tests where it is subjected to continuous X-ray radiation to such extent, that the glass darkens but the resin remains clear and transparent as well as retains the original desirable strength, adhesive, and flexible properties. The resin of the invention also withstands high build-up of static electric charges which occur or electronic vessels and envelopes without deleterious effects. Such resistance to loss of properties when exposed to high energy radiation and electric charges is of inestimable value for use in making of cathode ray tubes provided with laminated safety panels.

(6) The resin of the invention possesses such adhesion, flexibility, and strength that it serves as an excellent laminant for adhering glass shields or panels on the face of envelopes or bulbs wherein the face forms curves of short radius of curvature (usually referred to as "sharp" corners) with the side walls of the envelope. The quality of maintaining all desirable properties, although being employed as a laminant between glass surfaces having bends and folds of short radius of curvature, is especially exemplified in a television tube of the type shown in FIGURE 2. Heretofore such tube design was not possible because of the strains induced about the periphery of the laminant where the radius of curvature approaches that of a right angle. For best viewing and safety, it is desirable that the periphery of the safety panel extend over and, to some distance, behind the "sharp" corners, and usually extends along the outside of the side walls of the envelope to a distance just rearward or behind the edge of the phosphor screen which is positioned just inside and parallel to the viewing face.

(7) The resin of the invention provides such reliable and strong adhesive bonds when employed as a laminant between a television tube viewing face and a protective face plate that it may be and is employed as the supporting means for the entire picture tube in a television receiving set. It has been found that by providing suitable hangers along the periphery of the laminated protective plate or panel, the tube may be advantageously suspended thereby in the receiving set.

(8) In the uncured state, the resin is sufficiently fluid, adhesive, and free from any tendencies to form bubbles and the like, to serve as a highly appropriate laminant for use in an imposing number of laminating processes without the need for added pressure during laminating and cure. Heretofore safety glass, such as that made by employing polyvinylbutyral and other known laminants, have required relatively high pressures involving the use of pressuring means, presses, and other equipment, resulting in objectionable expenditures of time, labor and outlay.

Having described the invention, what is claimed and desired to be protected by Letters Patent is:

1. A cathode ray tube provided with a substantially shatter-proof safety panel comprising a cathode ray tube having a transparent viewing face, a transparent similarly contoured transparent panel substantially uniformly spaced therefrom in mating relationship and firmly bonded thereto by a flexible, tenaciously adhering, transparent, thermally stable cured solid resin consisting essentially of the reaction product of (A) a polyepoxide ether of an aromatic polyhydric compound, (B) a polyepoxide ether of an aliphatic polyhydric compound having an average of between about 1.5 and 2 oxirane groups per molecule, and (C) a modifier selected from aliphatic polyepoxide compounds having an average of more than 2 oxirane groups per molecule, said (A) and (B) being employed in the weight proportions of between 80 and 20 of each and said (C) being employed up to 40 parts by weight and (D) a curing agent, selected from the class consisting of a major proportion of a monoalkanolamine and a minor proportion of a polyalkylenepolyamine in an amount sufficient to provide between 0.5 and 1.5 equivalent hydrogen atoms per oxirane group in said resin composition.

2. A composition especially adaptable to produce transparent flexible elastomeric castings consisting essentially of (A) a first transparent polyglycidyl ether, (B) a second transparent polyglycidyl ether, and, a compatible hardening agent; said first polyglycidyl ether being a diglycidyl ether of 4,4'-isopropylidenediphenol said ether having a molecular weight of from about 900 to 1200; said second diglycidyl ether being a diglycidyl ether of polyoxypropylene glycol, said glycol having a molecular weight of about 400; said hardening agent being a mixture of about 5.5 parts by weight of monoethanolamine and about 1 part by weight of diethylenetriamine; the ingredients (A) and (B) being employed in an amount of about 33 parts of (A) and 67 parts of (B) said hardening agent being employed in an amount of about 6.5 parts by weight.

3. A laminar structure comprising a first transparent surface spaced apart from a generally similar transparent surface, said surfaces being held in opposite relationship by a transparent solid elastomeric adhesive resin composition consisting essentially of the reaction product of: (A) a first transparent polyglycidyl ether, (B) a second polyglycidyl ether, and a compatible hardening agent; said first polyglycidyl ether being a diglycidyl ether of 4,4'-isopropylidenediphenol, the ether having a molecular weight of from about 900 to 1200; said second diglycidyl ether being a diglycidyl ether of polyoxypropylene glycol, said glycol having a molecular weight of about 400; said hardening agent being a mixture of about 5.5 parts by weight of monoethanolamine and about 1 part by weight of diethylenetriamine; the ingredients (A) and (B) being employed in an amount by weight of about 33 parts of (A) and about 67 parts of (B) and said hardening agent being employed in an amount of about 6.5 parts.

4. A safety cathode ray tube comprising a cathode ray tube having a viewing surface, a transparent, generally similar, contoured plate spaced apart from said viewing surface and having said viewing surface adhered to said plate by a transparent solid flexible elastomeric composition consisting essentially of the cured reaction product of: (A) a first transparent polyglycidyl ether; (B) a second transparent polyglycidyl ether, and a compatible hardening agent; said first glycidyl ether being a diglycidyl ether of 4,4'-isopropylidenediphenol, said ether having a molecular weight of from about 900 to 1200; said second diglycidyl ether being a diglycidyl ether of polyoxypropylene glycol, said glycol having a molecular weight of about 400; said hardening agent being a mixture of about 5.5 parts by weight of monoethanolamine and about 1 part by weight of diethylenetriamine; the ingredients (A) and (B) being employed in an amount by weight of about 33 parts of (A) and 67 parts of (B) and said hardening agent being employed in an amount of about 6.5 parts.

5. The liquid homogeneous resinous composition curable on standing to an elastomeric thermoset resin which, when set, is capable of transmitting at least 80 percent of light within the visible spectrum incident thereto without adverse effect on the color or image produced by the light transmitted therethrough when said resin is in a layer that has a thickness not substantially greater than 0.1 inch, which is capable of forming cohesive bonds of high strength with glass in contact therewith during cure, which possesses high thermal stability, which has an elastic recovery of at least about 80 percent, and which better withstands sudden shock and pressure changes without damage, said resinous composition consisting essentially of a mixture of between about 25 and about 40 parts by weight of component (A) which is an aromatic polyepoxide ether of a polynuclear polyhydric phenol and between about 75 and about 60 parts by weight of component (B) which is an aliphatic polyepoxide ether of a dihydric aliphatic compound, to make 100 parts of (A) and (B), and a hardening agent consisting by weight of (1) between about 78 and about 92 percent of a monoalkanolamine having the generic formula wherein R and R' are independently selected from lower alkyl groups, and (2) between about 22 and about 8 weight percent, to make 100% of (1) and (2), of a polyalkylenepolyamine having the generic formula $$H_2N + R-NH-R \rightarrow_x NH_2$$

wherein R is an alkylene group containing from 2 to 18 carbon atoms and $x$ has a value of from 1 to 18, in a total amount of said hardening agent to provide between about 0.5 and about 1.5 equivalent amine hydrogen atoms per oxirane group present in said liquid resin composition.

6. The homogeneous resinous composition of claim 5 wherein component (A) has an epoxide equivalent weight of between about 170 and about 1,000 and component (B) has an epoxide equivalent weight of between about 87 and about 1,500.

7. The resinous composition of claim 5 wherein components (A) and (B) have admixed therewith, prior to admixture of said hardening agent therewith, up to about 40 parts by weight of component (C) which is the aliphatic polyhydric compound having more than two hydroxyl groups per molecule.

8. The resinous composition of claim 7 wherein the (C) component is the polyepoxide ether of glycerol-propylene oxide adduct having an average of more than 2 oxirane groups per molecule.

9. The resinous composition of claim 5 wherein said hardening agent consists of about 85 weight percent of monoethanolamine and about 15 percent of diethylenetriamine.

10. The solid transparent elastomeric thermoset resin made by curing the liquid homogeneous resinous composition of claim 5 at a temperature of between about 50° and about 400° F.

11. The thermoset resin of claim 10 wherein the (B) aliphatic polyepoxide ether is polyoxypropylene glycol polyepoxide having an epoxide equivalent weight of from about 200 to about 300.

12. A safety laminar structure for application to the face of a cathode ray tube consisting essentially of a mating transparent solid panel having the general contour of said viewing face in spaced apart substantially parallel position therewith to provide a space therebetween and the resin of claim 5 cured in situ in said space in firmly bonded relationship with said panel and said viewing face.

13. A cathode ray tube comprising an evacuated glass envelope, and phosphor screen for the reproduction of radio wave transmitted pictures, and a viewing face having a transparent panel adhered thereto by the resin of claim 5.

14. A television picture tube which comprises confining walls and a transparent viewing face inclosing picture-reproducing means comprising an electron gun and a phosphor screen, said viewing face being exterior of said phosphor screen and corresponding generally in shape and size thereto, and having an outer portion following the general outline of the perimeter thereof, which joins said confining walls at an angle having a short radius of curvature, and a transparent panel having the contour of said viewing face positioned in spaced apart, mating relationship therewith to form a substantially uniform space therebetween, extending at least to the periphery of said viewing face including said angle of short radius of curvature and terminating behind the perimeter of said inclosed phosphor screen, and the resin of claim 5 cured in situ in said space, including the portion thereof extending to the periphery of said viewing face beyond the angle of short radius of curvature.

15. The resinous composition of claim 5 wherein said monoalkanolamine is monoethanolamine.

16. The resinous composition of claim 5 wherein said monoalkanolamine is monoisopropanolamine.

17. The resinous composition of claim 5 wherein said monoalkanolamine is monobutanolamine.

18. The resinous composition of claim 5 wherein said polyalkylenepolyamine is diethylenetriamine.

19. The resinous composition of claim 5 wherein said polyalkylenepolyamine is triethylenetetramine.

20. The resinous composition of claim 5 wherein said polyalkylenepolyamine is tetraethylenepentamine.

21. The resinous composition of claim 5 wherein said polyalkylenepolyamine is diisopropylenetriamine.

22. The resinous composition of claim 5 wherein said polyalkylenepolyamine is triisopropylenetetramine.

23. The resinous composition of claim 5 wherein said polyalkylenepolyamine is dibutylenetriamine.

24. The resinous composition of claim 5 wherein said polyalkylenepolyamine is tributylenetetramine.

25. The resinous composition of claim 5 wherein said polyalkylenepolyamine is diethylaminopropylamine.

26. The resinous composition of claim 5 wherein said polyalkylenepolyamine is ethylisopropylaminopropylamine.

References Cited by the Examiner

UNITED STATES PATENTS

| | | | |
|---|---|---|---|
| 2,293,529 | 8/1942 | Bedford | 178—7.82 |
| 2,512,996 | 6/1950 | Bixler | 260—42 |
| 2,767,157 | 10/1956 | Masters | 260—42 |
| 2,981,702 | 4/1961 | St. Clair et al. | 260—42 |
| 3,051,782 | 8/1962 | Giacchetti et al. | 178—7.82 |
| 3,075,870 | 1/1963 | Hedler et al. | 178—7.82 X |

FOREIGN PATENTS 152,160 7/1953 Australia.

ROBERT L. GRIFFIN, *Primary Examiner.*

JOHN P. WILDMAN, *Examiner.*

M. GINSBURG, R. MURRAY, R. L. RICHARDSON,
*Assistant Examiners.*